(12) United States Patent
Devoldere et al.

(10) Patent No.: US 8,677,593 B2
(45) Date of Patent: Mar. 25, 2014

(54) METHOD FOR DISASSEMBLING AN ARRANGEMENT

(75) Inventors: Tom Gabriel Devoldere, Brugge (BE); Attila Albert-Nagy, Sfantu Gheorghe (RO); Adriaan Van Horenbeek, Lubbeek (BE)

(73) Assignee: TP Vision Holding B.V., Eindhoven (NL)

( * ) Notice: Subject to any disclaimer, the term of this patent is extended or adjusted under 35 U.S.C. 154(b) by 94 days.

(21) Appl. No.: 13/386,772

(22) PCT Filed: Jul. 28, 2010

(86) PCT No.: PCT/IB2010/053421
§ 371 (c)(1),
(2), (4) Date: Jan. 24, 2012

(87) PCT Pub. No.: WO2011/013074
PCT Pub. Date: Feb. 3, 2011

(65) Prior Publication Data
US 2012/0124801 A1 May 24, 2012

(30) Foreign Application Priority Data
Jul. 31, 2009 (EP) .................................... 09166973

(51) Int. Cl.
*B23P 19/04* (2006.01)
*F16B 19/00* (2006.01)

(52) U.S. Cl.
USPC ........................................ 29/426.6; 411/508

(58) Field of Classification Search
USPC ...................... 403/31; 411/DIG. 3, 508, 913
See application file for complete search history.

(56) References Cited

U.S. PATENT DOCUMENTS 3,756,115 A * 9/1973 Schuplin ........................ 411/508

FOREIGN PATENT DOCUMENTS

| | | |
|---|---|---|
| FR | 2561325 A3 | 9/1985 |
| GB | 1304476 A | 1/1973 |

OTHER PUBLICATIONS

Willems, B.; Dewulf, W.; Duflou, J.R., "Pressure-triggered active fasteners: Design results using topology optimization," Electronics & the Environment, Proceedings of the 2007 IEEE International Symposium on , vol., No., pp. 184,189, May 7-10, 2007.*
Willems et al: Concepts and Verification Model for Pressure Triggered One-To-Many Disassembly Fasteners, Proceedings of the CIRP-13th International Conference on Life Cycle Engineering, Jun. 2006, vol. 2, pp. 405-410.

* cited by examiner

*Primary Examiner* — David Bryant
*Assistant Examiner* — Matthew P Travers
(74) *Attorney, Agent, or Firm* — Shimokaji & Assoc., P.C.

(57) ABSTRACT

To disassemble an arrangement comprising a first part (1) with a first opening, a second part (2) with a second opening and a cavity, and a connector (3) with a first portion (31) and a second portion (32) inserted through the first opening and the second opening into the cavity for connecting the first and second parts (1, 2), a pressure difference is used for forcing the second portion (32) out of the cavity. Said pressure difference may involve firstly changing a surrounding pressure, such as slowly increasing the surrounding pressure, and secondly changing the surrounding pressure, such as quickly decreasing the surrounding pressure. The arrangement is arranged to not respond to said firstly changing and to respond to said secondly changing for said forcing out. The connector may comprise a third portion (33) with upper parts of legs, the first portion (31) comprising a head portion, and the second portion (32) comprising lower parts of the legs.

12 Claims, 2 Drawing Sheets

METHOD FOR DISASSEMBLING AN ARRANGEMENT

FIELD OF THE INVENTION

The invention relates to a method for disassembling an arrangement comprising a first part with a first opening, a second part with a second opening and a cavity, and a connector with a first portion and a second portion. The invention also relates to an arrangement comprising a first part with a first opening, a second part with a second opening and a cavity, and a connector with a first portion and a second portion. The invention also relates to a connector. Examples of such an arrangement are consumer products and professional products and parts of such products.

BACKGROUND OF THE INVENTION

The article "Concepts and verification model for pressure triggered one-to-many disassembly fasteners" by Barbara Willems, Wim Dewulf and Joost R. Duflou, Katholieke Universiteit Leuven, Mechanical Engineering Department, Belgium, discloses a hollow fastener that is deformed under pressure. By increasing the pressure, the hollow fastener is deformed and disassembly takes place. This fastener is relatively complex.

SUMMARY OF THE INVENTION

It is an object of the invention to provide a method for disassembling an arrangement that comprises a relatively simple connector. It is a further object of the invention to provide an arrangement that comprises a relatively simple connector, and to provide a relatively simple connector.

According to a first aspect of the invention, a method is provided for disassembling an arrangement comprising a first part with a first opening, a second part with a second opening and a cavity, and a connector with a first portion and a second portion, which second portion has been inserted through the first opening and the second opening into the cavity for connecting the first and second parts, which method comprises a step of using a pressure difference for forcing the second portion out of the cavity.

When assembling an arrangement comprising a first part with a first opening, a second part with a second opening and a cavity, and a connector with a first portion and a second portion, the second portion of the connector is inserted through the first opening and the second opening into the cavity for connecting the first and second parts. To disassemble, by using a pressure difference, such as for example a first pressure on at least a part of the second portion of the connector and a second pressure on at least a part of the first portion of the connector, which first and second pressures are different pressures, the second portion can be forced out of the cavity. This way, a complex fastener is no longer required, and a simple connector can be used.

An example of introducing such a pressure difference might be to put the arrangement into a pressure room at normal pressure and to suddenly decrease the pressure in the closed pressure room.

An opening may comprise a hole of any kind of shape and/or may comprise a cleft or a crevice or a crack or a slit of any kind of shape etc.

According to an embodiment, the method is defined by said step comprising:
firstly changing a surrounding pressure in a first manner, and
secondly changing the surrounding pressure in a second manner, the first and second manners being different manners, the arrangement being arranged to not respond to said firstly changing, and the arrangement being arranged to respond to said secondly changing for said forcing out.

When disassembling this arrangement, firstly a surrounding pressure is changed in a first manner, and secondly the (firstly changed) surrounding pressure is changed in a second manner. The first and second manners are different manners. Owing to the fact that the arrangement does not respond substantially to said firstly changing, but does respond substantially to said secondly changing, the first and second parts are disconnected and the assembled arrangement is disassembled.

According to an embodiment, the method is defined by said firstly changing the surrounding pressure in the first manner corresponding with increasing the surrounding pressure at a first rate, said secondly changing the surrounding pressure in the second manner corresponding with decreasing the surrounding pressure at a second rate. Preferably, when disassembling the arrangement, firstly a surrounding pressure is increased at a first, for example relatively small rate, and secondly the (increased) surrounding pressure is decreased at a second, for example relatively large rate.

According to an embodiment, the method is defined by the first rate defining a first pressure change per time interval, the second rate defining a second pressure change per time interval, and the first rate being smaller than the second rate, a difference between the first and second rates being such that said firstly changing the surrounding pressure in the first manner can reach the cavity although substantially closed by the connector and being such that said secondly changing the surrounding pressure in the second manner cannot substantially reach the cavity resulting in the connector being pushed out. Preferably, an increase of the surrounding pressure is done relatively slowly. In that case, either owing to the fact that the connector does not close the cavity for 100% or owing to the fact that the connector is designed to let relatively slow pressure changes through, this increase of the surrounding pressure can reach the cavity substantially. A decrease of the (increased) surrounding pressure is done relatively quickly. In that case, the decrease of the (increased) surrounding pressure cannot reach the cavity substantially and as a result the connector is pushed out.

To close the cavity and/or to let relatively slow pressure changes through, the connector may comprise at least partial flexibility and/or at least partial resiliency etc. and/or may comprise moveable and/or flexible and/or resilient pieces such as legs as discussed for the coming embodiment etc. Said flexibility and/or resiliency and/or pieces may further be used for improving a connection between the first and second parts and/or increasing a robustness of the assembled arrangement.

According to an embodiment, the method is defined by the connector comprising a third portion, the first portion comprising a head portion having a size larger than a size of the first opening, the third portion comprising upper parts of legs connected to the head portion, and the second portion comprising lower parts of said legs, which legs are in a first position while inserting the second portion through the first opening and the second opening, which legs are in a second position after having been fully inserted into the cavity, and which legs are forced into a third position while secondly changing the surrounding pressure in the second manner, said legs in the first position and in the third position being located closer to each other than in the second position. Usually, the first and third positions will be similar positions.

According to an embodiment, the method is defined by the legs each comprising a shape for in the second position locking the connector. This way, a robustness of the assembled arrangement is increased.

According to an embodiment, the method is defined by the connector comprising a valve or a ventil. Such a valve or ventil allows said first and second rates to become relatively similar.

According to a second aspect of the invention, an arrangement is provided comprising a first part with a first opening, a second part with a second opening and a cavity, and a connector with a first portion and a second portion, which second portion has been inserted through the first opening and the second opening into the cavity for connecting the first and second parts, the arrangement being arranged to respond to a pressure difference for forcing the second portion out of the cavity. This arrangement is suited to be disassembled by the method discussed above.

According to an embodiment, the arrangement is defined by said responding to the pressure difference comprising:
not responding to firstly changing a surrounding pressure in a first manner, and
responding to secondly changing the surrounding pressure in a second manner for said forcing out, the first and second manners being different manners.

According to an embodiment, the arrangement is defined by said firstly changing the surrounding pressure in the first manner corresponding with increasing the surrounding pressure at a first rate, said secondly changing the surrounding pressure in the second manner corresponding with decreasing the surrounding pressure at a second rate.

According to an embodiment, the arrangement is defined by the first rate defining a first pressure change per time interval, the second rate defining a second pressure change per time interval, and the first rate being smaller than the second rate, a difference between the first and second rates being such that said firstly changing the surrounding pressure in the first manner can reach the cavity although substantially closed by the connector and being such that said secondly changing the surrounding pressure in the second manner cannot substantially reach the cavity resulting in the connector being pushed out.

According to an embodiment, the arrangement is defined by the connector comprising a third portion, the first portion comprising a head portion having a size larger than a size of the first opening, the third portion comprising upper parts of legs connected to the head portion, and the second portion comprising lower parts of said legs, which legs are in a first position while inserting the second portion through the first opening and the second opening, which legs are in a second position after having been fully inserted into the cavity, and which legs are forced into a third position while secondly changing the surrounding pressure in the second manner, said legs in the first position and in the third position being located closer to each other than in the second position.

According to an embodiment, the arrangement is defined by the legs each comprising a shape for in the second position locking the connector.

According to an embodiment, the arrangement is defined by the connector comprising a valve or a ventil.

According to a third aspect of the invention, a connector is provided that is arranged to be used in one or more of the arrangements as defined above.

Such a connector may comprise at least partial flexibility and/or at least partial resiliency etc. and/or moveable/flexible/resilient pieces and/or a valve or a ventil etc.

An insight might be that complex fasteners are to be avoided and simple connectors are to be preferred.

A basic idea might be that, for disassembling an arrangement comprising a first part, a second part and a connector, a pressure difference is to be used for a forcing out purpose.

A problem to provide a method for disassembling an arrangement that comprises a relatively simple connector has been solved.

A further advantage might be that the simple connector can be low cost and robust and that less extreme pressure values might be used (the prior art for example uses 70 or 80 bar, the invention for example uses 1 or 2 bar).

These and other aspects of the invention are apparent from and will be elucidated with reference to the embodiment(s) described hereinafter.

DETAILED DESCRIPTION OF EMBODIMENTS

Figure 1:
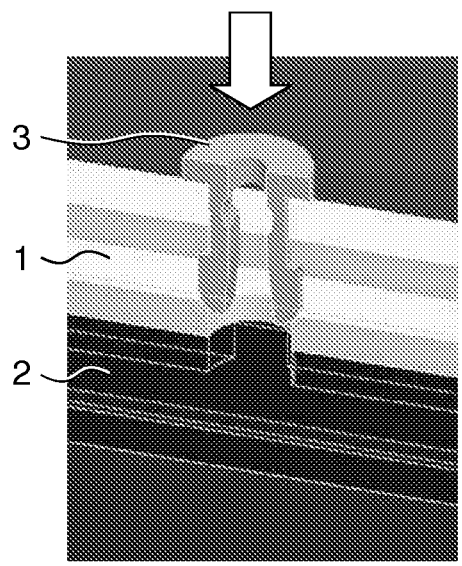
FIG. 1 shows an arrangement while being assembled.

In the FIG. 1, an arrangement is shown while being assembled (assembling phase). The arrangement comprises a first part 1 with a first opening, a second part 2 with a second opening and a cavity, and a connector 3. When being assembled, the lower part of the connector 3 is inserted, for example by hand, through the first opening and the second opening into the cavity in a direction as indicated by the arrow for connecting the first and second parts 1 and 2.

Figure 2:
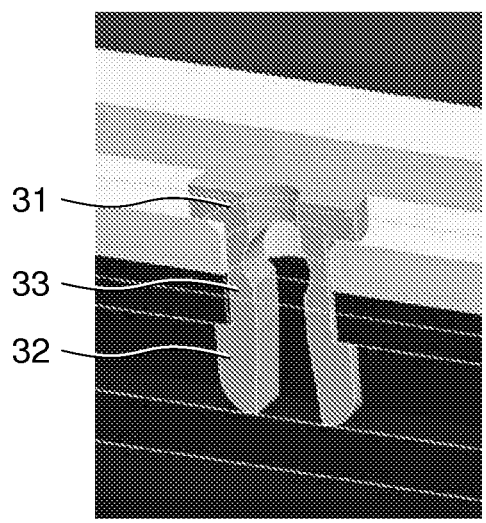
FIG. 2 shows an assembled arrangement.

In the FIG. 2, an assembled arrangement is shown. The connector 3 comprises a first portion 31, a second portion 32 and a third portion 33. The first portion 31 comprises a head portion having a size (such as for example a diameter) larger than a size (such as for example a diameter) of the first opening. The third portion 33 comprises upper parts of legs connected to the head portion, and the second portion 32 comprises lower parts of said legs.

Figure 3:
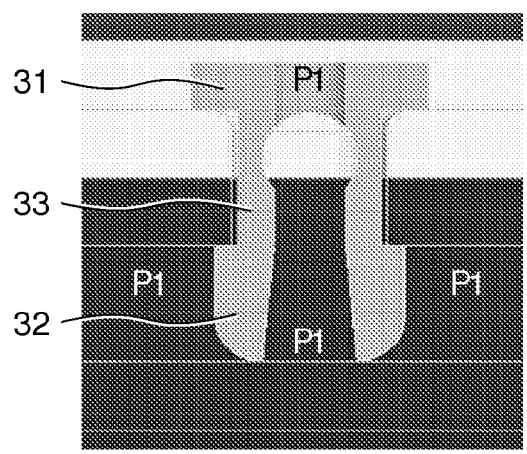
FIG. 3 shows an arrangement in a first disassembling phase.

In the FIG. 3, an arrangement is shown in a first disassembling phase. Anywhere, there is a first pressure P1, for example 2 bar.

Figure 4:
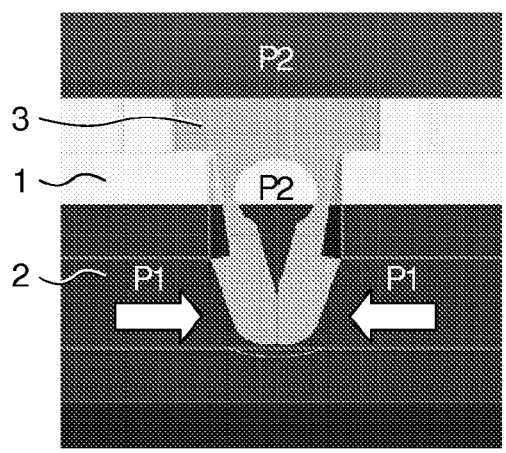
FIG. 4 shows an arrangement in a second disassembling phase.

In the FIG. 4, an arrangement is shown in a second disassembling phase. In the cavity, there still is the first pressure P1, for example 2 bar, but between the legs and outside the arrangement, there is a second pressure P2, for example 1 bar. As a result, forces are exerted on the legs as indicated by the arrows.

Figure 5:
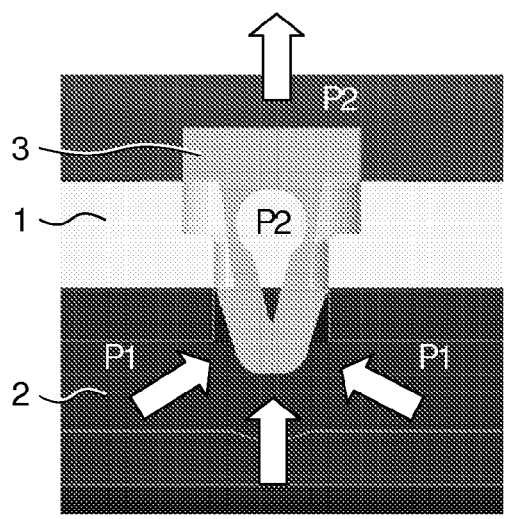
FIG. 5 shows an arrangement in a third disassembling phase.

In the FIG. 5, an arrangement is shown in a third disassembling phase. Said forces as indicated by the arrows push the connector 3 out of the second part 2.

For the FIG. 3-5, this first pressure P1 has for example been created at a first rate, which first rate is a relatively small rate, whereby a pressure is increased during a first time interval until the first pressure P1 has been reached, which first time interval is a relatively long time interval. This second pressure P2 has for example been created at a second rate, which second rate is a relatively large rate, whereby a pressure is decreased during a second time interval until the second pressure P2 has been reached, which second time interval is a relatively short time interval. The first time interval is such that the first pressure P1 can reach the cavity. The closure of the cavity is such that the first pressure P1 will mainly stay until the second pressure P2 is introduced. The second time interval and the closure of the cavity are such that in the cavity the first and second pressures P1 and P2 cannot mix with each other until the connector 3 is pushed out.

The arrangement is arranged to respond to a pressure difference for forcing the second portion 32 out of the cavity. An example of introducing such a pressure difference might be to put the arrangement into a pressure room at normal pressure (1 bar) and to suddenly decrease the pressure (0.1 bar) in the closed pressure room.

Preferably (owing to the fact that it might be easier to quickly go from 2 bar to 1 bar than to quickly go from 1 bar to 0.1 bar), the arrangement is arranged to not respond to firstly changing a surrounding pressure in a first manner at a first rate, such as for example slowly increasing the pressure surrounding the arrangement until P1 has been reached. The arrangement is arranged to respond to secondly changing the (firstly changed) surrounding pressure in a second manner at a second rate for disconnecting the first and second parts 1 and 2, such as for example quickly decreasing the (increased) pressure surrounding the arrangement until P2 has been reached.

A difference between the first and second rates may be such that said firstly changing the surrounding pressure in the first manner can reach the cavity although substantially closed by the connector 3 and may be such that said secondly changing the (firstly changed) surrounding pressure in the second manner cannot substantially reach the cavity resulting in the connector 3 being pushed out. An increase of the surrounding pressure is done relatively slowly. In that case, either owing to the fact that the connector 3 does not close the cavity for 100% or owing to the fact that the connector 3 is designed to let relatively slow pressure changes through, this increase of the surrounding pressure can substantially reach the cavity. A decrease of the (increased) surrounding pressure is done relatively quickly. In that case, the decrease of the (increased) surrounding pressure cannot substantially reach the cavity and as a result the connector 3 is pushed out.

The legs are in a first position while inserting the second portion 32 through the first opening and the second opening. The legs are in a second position after having been fully inserted into the cavity. The legs are forced into a third position while secondly changing the (firstly changed) surrounding pressure in the second manner. In the first position and in the third position the legs are located closer to each other than in the second position. Preferably, the legs each have a shape for in the second position locking the connector 3, to increase a robustness of the assembled arrangement.

In case the connector 3 is provided with a valve or a ventil that is arranged to let an outside pressure enter the cavity (which outside pressure is higher than an inside pressure in the cavity) and that is arranged to prevent an inside pressure in the cavity from leaving this cavity (which inside pressure is higher than an outside pressure), a length of the first time interval may be decreased substantially, and may for example become relatively similar to a length of the second time interval.

The invention improves traditional disassembly of products that is costly because of expensive labor hours to dismantle. A reason for this is that each connection needs to be located and unscrewed or unlocked. This is also called one to one disassembly (each connector needs an action to be unlocked). The idea is to put a consumer or professional product in a pressure room, and then for example to slowly increase the pressure and then to suddenly drop the pressure. By the sudden pressure difference, the connectors jump out of the product and the product falls apart in its single components. The proposed connector does not have a closed cavity inside itself as the prior art shows, but the cavity in the second part is closed by the connector during assembly. This makes the connector easy to produce with a simple open-close mould construction.

Summarizing, to disassemble an arrangement comprising a first part 1 with a first opening, a second part 2 with a second opening and a cavity, and a connector 3 with a first portion 31 and a second portion 32 inserted through the first opening and the second opening into the cavity for connecting the first and second parts 1, 2, a pressure difference is used for forcing the second portion 32 out of the cavity. Said pressure difference may involve firstly changing a surrounding pressure, such as slowly increasing the surrounding pressure, and secondly changing the surrounding pressure, such as quickly decreasing the surrounding pressure. The arrangement is arranged to not respond to said firstly changing and to respond to said secondly changing for said forcing out. The connector may comprise a third portion 33 with upper parts of legs, the first portion 31 comprising a head portion, and the second portion 32 comprising lower parts of the legs.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A method for disassembling an arrangement comprising a first part with a first opening, a second part with a second opening and a cavity, and a connector with a first portion and a second portion, which second portion has been inserted through the first opening and the second opening into the cavity for connecting the first and second parts, which method comprises:

changing a surrounding pressure in a first manner by increasing the surrounding pressure at a first rate;

changing the surrounding pressure in a second manner by decreasing the surrounding pressure at a second rate, using a pressure difference for forcing the second portion out of the cavity, wherein the first and second manners are different manners, the arrangement being arranged to not respond to said changing via the first manner, and the arrangement being arranged to respond to said changing via the second manner for said forcing out the second portion.

2. The method as defined in claim 1, the first rate defining a first pressure change per time interval, the second rate defining a second pressure change per time interval, and the first rate being smaller than the second rate, a difference between the first and second rates being such that said changing the surrounding pressure in the first manner can reach the cavity although substantially closed by the connector and being such that said changing the surrounding pressure in the second manner cannot substantially reach the cavity resulting in the connector being pushed out.

3. The method as defined in claim 1, the connector comprising a third portion, the first portion comprising a head portion having a size larger than a size of the first opening, the third portion comprising upper parts of legs connected to the head portion, and the second portion comprising lower parts of said legs, which legs are in a first position while inserting the second portion through the first opening and the second opening, which legs are in a second position after having been fully inserted into the cavity, and which legs are forced into a third position while secondly changing the surrounding pressure in the second manner, said legs in the first position and in the third position being located closer to each other than in the second position.

4. The method as defined in claim 3, the legs each comprising a shape for in the second position locking the connector.

5. The method as defined in claim 1, the connector comprising a valve.

6. An arrangement comprising:
a first part with a first opening;
a second part with a second opening and a cavity;
a connector with a first portion and a second portion, which second portion has been inserted through the first opening and the second opening into the cavity for connecting the first and second parts; and,
a valve in the connector wherein the arrangement is arranged to respond to a pressure difference for forcing the second portion out of the cavity.

7. The arrangement as defined in claim 6, said responding to the pressure difference comprising:
not responding to firstly changing a surrounding pressure in a first manner, and
responding to secondly changing the surrounding pressure in a second manner for said forcing out, the first and second manners being different manners.

8. The arrangement as defined in claim 7, said firstly changing the surrounding pressure in the first manner corresponding with increasing the surrounding pressure at a first rate, said secondly changing the surrounding pressure in the second manner corresponding with decreasing the surrounding pressure at a second rate.

9. The arrangement as defined in claim 8, the first rate defining a first pressure change per time interval, the second rate defining a second pressure change per time interval, and the first rate being smaller than the second rate, a difference between the first and second rates being such that said firstly changing the surrounding pressure in the first manner can reach the cavity although substantially closed by the connector and being such that said secondly changing the surrounding pressure in the second manner cannot substantially reach the cavity resulting in the connector being pushed out.

10. The arrangement as defined in claim 8, the connector comprising a third portion, the first portion comprising a head portion having a size larger than a size of the first opening, the third portion comprising upper parts of legs connected to the head portion, and the second portion comprising lower parts of said legs, which legs are in a first position while inserting the second portion through the first opening and the second opening, which legs are in a second position after having been fully inserted into the cavity, and which legs are forced into a third position while secondly changing the surrounding pressure in the second manner, said legs in the first position and in the third position being located closer to each other than in the second position.

11. The arrangement as defined in claim 10, the legs each comprising a shape for in the second position locking the connector.

12. A connector comprising:
a head portion including a valve;
a pair of legs coupled to the head portion, the pair of legs include a top portion coupled to the head portion and a bottom portion extending from the top portion, wherein
the bottom portion of the legs extend radially outward in response to an increasing pressure applied to the head portion, and
the bottom portion of the legs contract radially inward in response to a decreasing pressure applied to the head portion.

* * * * *